United States Patent [19]

McCallum, III et al.

[11] Patent Number: 5,408,561
[45] Date of Patent: Apr. 18, 1995

[54] FLEXIBLE DIELECTRIC FIBER OPTIC DROP CABLE

[75] Inventors: William J. McCallum, III, Hickory; Gregory A. Mills, Claremont; Ilona W. Schmidt, Hickory, all of N.C.

[73] Assignee: Siecor Corporation, Hickory, N.C.

[21] Appl. No.: 216,376

[22] Filed: Mar. 23, 1994

[51] Int. Cl.6 ............................................. G02B 6/36
[52] U.S. Cl. ................................................. 385/109
[58] Field of Search ........................ 385/100, 109, 147

[56] References Cited

U.S. PATENT DOCUMENTS

| | | | |
|---|---|---|---|
| 4,892,382 | 1/1990 | Story et al. | 385/109 |
| 4,938,560 | 7/1990 | Arroyo et al. | 385/107 |
| 5,181,268 | 1/1993 | Chien | 385/128 |
| 5,305,410 | 4/1994 | Arroyo | 385/109 |
| 5,305,411 | 4/1994 | Arroyo | 385/109 |

OTHER PUBLICATIONS

Bellcore Technical Reference TR-TSY-000843 (1989) "Northern Telecom Announces a Fiber Optic Drop Cable" Northern Telecom Canada Ltd. 1991.

*Primary Examiner*—Akm E. Ullah
*Attorney, Agent, or Firm*—J. David Abernathy

[57] ABSTRACT

An optical service cable has a flexural modulus of elasticity of less than 300 MPa. Water absorptive and strength members are laid over a light waveguide core. The cable is suitable for buried service cable applications.

20 Claims, 2 Drawing Sheets

FLEXIBLE DIELECTRIC FIBER OPTIC DROP CABLE

BACKGROUND OF THE INVENTION

The field of the invention is optical service cable, sometimes called drop cable.

Bell Communications Research issued its technical reference TR-TSY-000843 in January of 1989 titled "Generic Requirements for Optical and Optical/Metallic Buried Service Cable". As the subject of the invention is a dielectric service cable, any requirements for metallic members in an optical/metallic buried service cable will not be set out herein.

As stated in the technical reference, the environment of buried service cable is one of the most severe in the network. Such cables run from a service access point to individual subscribers, which may be homes or businesses. Some portions of the cable may be above ground, while other portions are buried only to a shallow depth. Because the cable will be attached to a building network, fire retardancy and flexibility are requirements. The cable will typically be bent to a two inch diameter and slack is stored in coils of small diameter.

The stated requirements for non-armored all dielectric cables state that optical fibers are contained in the core which is enclosed by a jacket. Water-blocking materials are to be used within the core and between the core and the jacket. A jacket slitting cord is also required. FIG. 2—2 of the technical reference discloses two optical fibers and filling compound within a buffer tube. The buffer tube is coated by a flame retardant jacket having six strength members embedded therein at approximately equal angles of separation from each other. Other cable requirements and tests are included, such as cable bend test and flammability testing. It is further stated that the outer jacket shall be black plasticized polyvinyl chloride (PVC).

In practice, the requirements for buried service cable have proven to be challenging.

AT&T produced a dielectric drop cable in 1989 which featured two buffered optical fibers and a filling compound in a nylon tube. A PVC jacket was directly extruded over three impregnated fiberglass strands and two water swellable threads. With so few strength members, it is believed that fiber strain could be equivalent to cable strain under certain conditions. In addition, it is believed that this cable might fail the required flame test.

Another early dielectric drop cable was produced by Siecor in 1989. This cable included tensile members, but no antibuckling members, between the core buffer tube and the outer jacket. As a result, this cable had a flexural modulus of elasticity of less than 50 MPa, and ultimately proved to be subject to kinking.

A later AT&T dielectric drop cable was produced in 1991. The cable contained two fight buffered fibers and a filling compound in a nylon buffer tube. A PVC outer jacket was directly extruded over two groups of two impregnated fiberglass strands located 180 degrees apart between the buffer tube and the outer jacket. A water swellable yarn was provided with each pair of strength elements. While this cable was far stronger than the previous cables, it was extremely stiff and difficult to handle, having a flexural modulus of elasticity of greater than 400 MPa. Thus, it is believed that this cable could be bent into two inch loops with only the greatest difficulty, if at all.

Northern Telecom has also introduced a two fiber drop cable stated to meet the demands of the technical reference. This cable has a metallic sheath, however. An unbroken layer of glass strength members is laid over the buffer tube and a water swellable tape is wrapped around the strength members to enhance water blocking performance. A water blocking gel along with two tight buffered optical fibers are contained in the buffer tube.

It is believed that the cables described above have not adequately met the needs of the industry for a dielectric drop cable which meets the requirements of the technical reference, is not too stiff, yet does not kink. These requirements are met by the cable according to the invention.

SUMMARY OF THE INVENTION

The cable according to the invention includes a core buffer tube loosely holding a plurality of light waveguides therein, the length of each light waveguide being greater than the length of the buffer tube, and each light waveguide having a colored or uncolored outer coating. Each light waveguide preferably has an outer coating of a material having a secant flexural modulus of elasticity at 5% strain of less than 200 MPa.

Surrounding the buffer tube is a system including at least one water absorptive member and at least two strength members. The strength members are laid over the water absorptive member in a way such that the strength members cross over the water absorptive member at intervals of a length between 10 and 500 mm. An outer flame retardant plastic jacket is extruded directly onto the plurality of strength members and a rip cord.

The light waveguide outer coating may comprise either an ultraviolet light cured acrylate material or a plasticizer-free thermoplastic material. At least one tensile filament, such aramid fiber, may be laid with the plurality of strength members. The cable is all dielectric. The cable as a whole has a flexural modulus of elasticity of greater than 50 MPa and less than 300 MPa, preferably between 50 MPa and 100 MPa. The strength members may be resin impregnated fiberglass yarns. The cable is an optical service cable (sometimes called drop cable) meeting the requirements of Bellcore technical reference TR-TSY-000843 excepting those portions applicable only to cables having metallic elements. The cable is flexible enough to meet both the letter and the spirit of the flexibility requirements for a drop cable, yet does not kink and has a minimum tensile load rating of at least 1000N, exceeding the minimum tensile load rating requirement of the technical reference.

BRIEF DESCRIPTION OF THE DRAWINGS

The detailed description of the preferred embodiments is made with reference to the drawings, in which.

DETAILED DESCRIPTION OF THE PREFERRED EMBODIMENT

Figure 1:
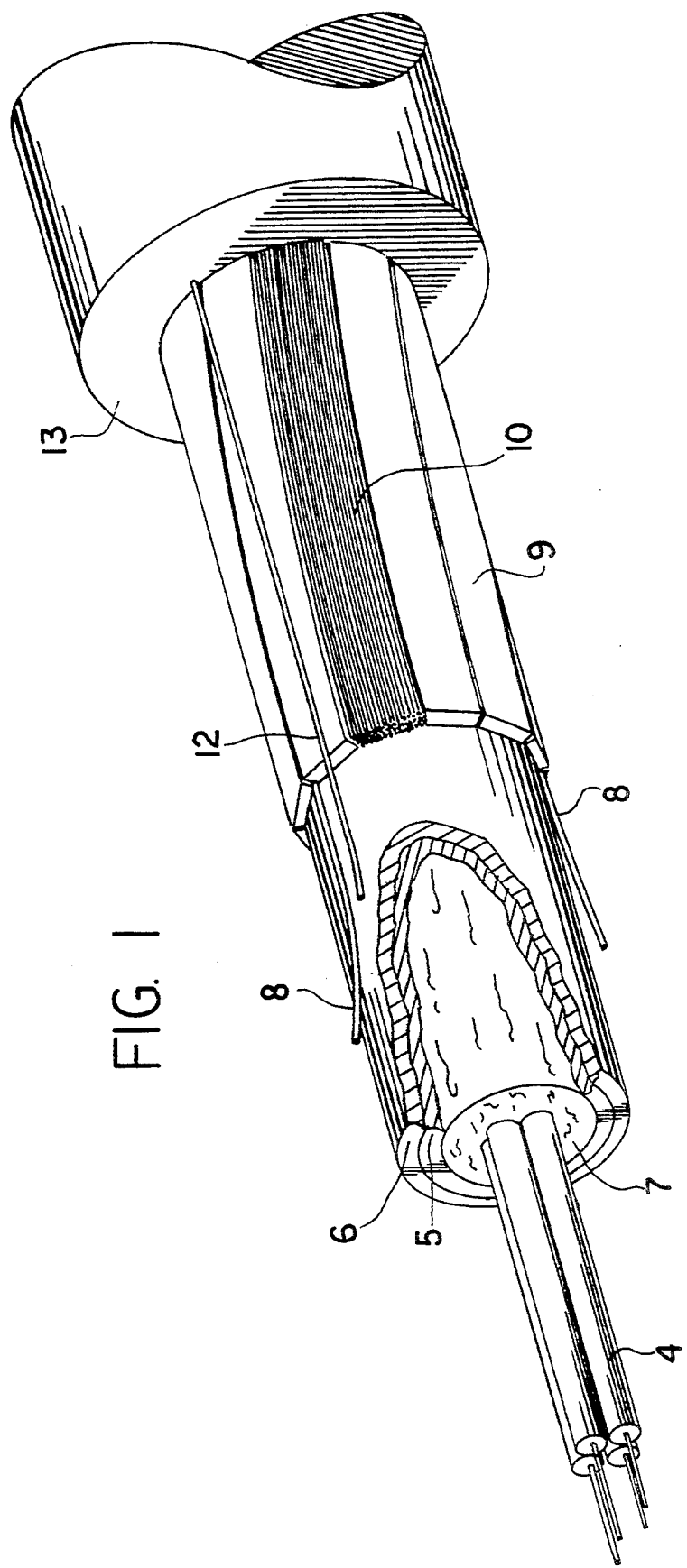
FIG. 1 is a fragmented perspective view of the cable according to the invention.
Figure 2:
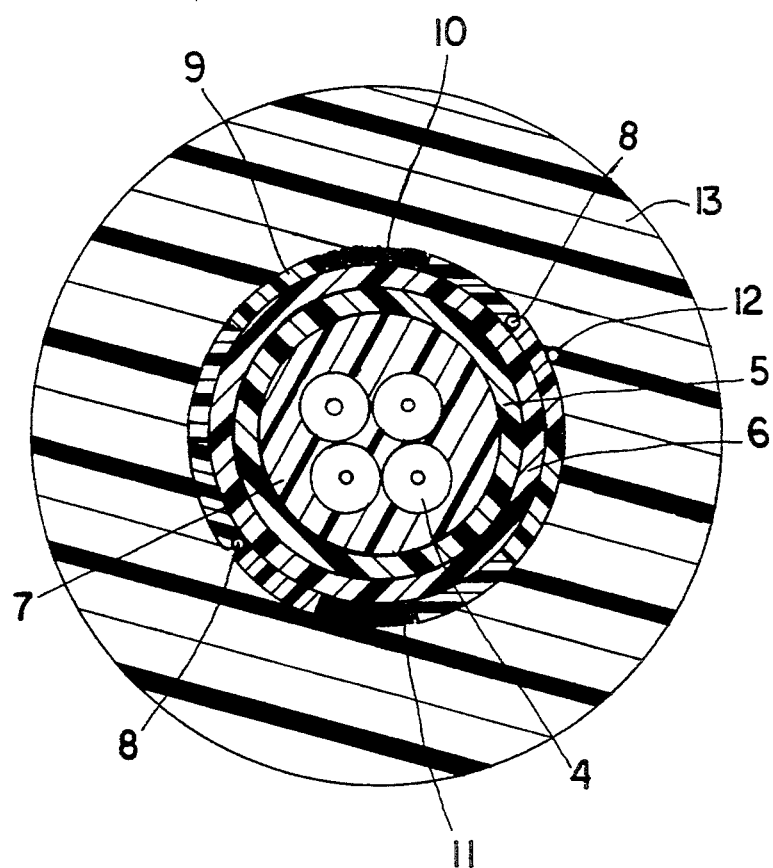
FIG. 2 is a cross-sectional view of the same cable.

The core of the cable according to the preferred embodiment contains a plurality of fight waveguides each having an outer coating 4. The structure of each light waveguide is generally that disclosed in Chien, U.S. Pat. No. 5,181,268, assigned to Coming Incorporated and incorporated herein by reference. Each light waveguide has an intermediate coating of a slipping layer such as TEFLON plastic, and laid over the slipping layer is an outer coating of a material having a secant flexural modulus of elasticity at a 5% strain of less than 200 MPa. Outer light waveguide coating 4 may comprise either a plasticizer free thermoplastic material such as polyurethane or a polyvinyl chloride-polyurethane aggregate, or an ultraviolet curable material such as urethane, silicone, or epoxy acrylate. The diameter of the light waveguide core and cladding is approximately 125 microns. The diameter of the core and cladding with an ultraviolet light cured acrylate layer or layers thereon is approximately 250 microns; the width of the TEFLON layer is approximately 5 microns; and the light waveguide is then covered by the outer coating over the slip layer out to approximately 900 microns. Since the outer light waveguide coating layer has a low secant flexural modulus of elasticity, it also has a low "memory" such that the fiber can be coiled easily without tending to return to a previous shape.

The light waveguide and a hydrocarbon based filling compound 7 are contained in a core buffer tube having polycarbonate inner layer 5 and outer polybutylene terephthalate layer 6.

The length of each of the light waveguides is greater than the length of the buffer tube, and are free to, move with respect to the buffer tube.

Laid over the buffer tube are two waterblocking yarns 8 located on opposite sides of the buffer tube. Yarns 8 are applied longitudinally, but may be stranded if desired. Waterblocking yarns 8 and impregnated fiberglass members 9 may be stranded in opposite directions. Fiberglass members 9 cross over yarns 8 at intervals of a length between 50 and 220 mm.

Laid over waterblocking yarns 8 is a layer of impregnated fiberglass yarn members 9; also laid with impregnated fiberglass yarn members 9 are two bundles of aramid yarns 10, 11 located 180 degrees from each other in the layer. Fiberglass yarn members 9 and aramid yarn members 10, 11 are stranded helically with a constant lay and with constant and equal tensions. Fiberglass yarn members 9 are impregnated with resin to provide antibuckling protection to the cable. Yarn members 9 have a Young's modulus of 52,000 MPa. The lay length of the layer containing members 9, 10, 11 is 150 mm, with a range between 50 and 220 mm.

Outer jacket 13 is pressure extruded over the yarn layer to eliminate space into which water could travel. The combination of pressure extrusion and strength yarns eliminates any need for glue or other adhesives as a binder for the strength member system.

The flame retardant outer jacket 13 is provided with UV fight stabilizer, enhanced low and high temperature plasticizer, and is free from lead and cadmium stabalizers. A non arsenic fungicide is included. Outer sheath 13 has a tensile modulus in the range of 10 to 20 MPa over the tensile range. Its coefficient of thermal expansion is 300 to 400 degrees $C^{-1} \times 10^{-6}$ and has a minimum ultimate elongation of 150% and a minimum 30% limiting oxygen index.

The cable as described in the preferred embodiment has a minimum tensile load rating of 300 lbf, or 1336N, without an average increase in fight waveguide attenuation of more than 0.40 dB, and a flexural modulus of elasticity of between 75 and 100 MPa as measured by ASTM D790-92. By adding additional aramid yarn strands to the cable, increasing the modulus of the yarn, or increasing the yarn denier size, one can achieve even greater tensile load ratings and maintain a cable secant flexural modulus of elasticity of less than 300 MPa; however, the preferred embodiment as described has a rated tensile load of more than double the Bellcore requirement while keeping the flexural modulus of elasticity at less than 100 MPa.

In order to construct the cable, a dual layer buffer tube is extruded using conventional polymer extrusion equipment over the buffered optical fibers to form a round cross section. Hydrocarbon filling compound 7 is included during this process to fill the void inside the buffer tube. Waterblocking yarns 8 are paid off to lay longitudinally over the tube. Strength elements 10, 11 and antibuckling elements 9 are wound helically using a spinner. A close fitting die aligns yarns 9, 10, 11 over the tube. Jacket rip cord 12 is paid off to lay longitudinally over the yarns. Jacket 13 is pressure extruded over the assembly using a polymer extruder to complete the construction. Jacket identifying marks are applied to the jacket surface.

What is claimed is:

1. An optical service cable, comprising:
   a core buffer tube;
   a plurality of light waveguides loosely held in the core buffer tube, the length of each light waveguide being greater than the length of the core buffer tube, and each light waveguide having an outer coating;
   a water absorptive member laid over the buffer tube and a plurality of anti-buckling members laid over the water absorptive member such that the anti-buckling members cross over the water absorptive member at intervals of a length between 50 and 220 mm; and,
   a flame retardant outer jacket containing the core buffer tube, water absorptive member, and anti-buckling members, the cable being all dielectric, being able to withstand a tensile force of at least 668N without an average increase in light waveguide attenuation of more than 0.40 dB, and having a flexural modulus of elasticity of less than 300 MPa.

2. An optical service cable as recited in claim 1 wherein the light waveguide outer coating comprises an ultraviolet light cured acrylate material.

3. An optical service cable as recited in claim 1 wherein the outer light waveguide coating comprises a plasticizer-free thermoplastic material.

4. An optical service cable as recited in claim 1 wherein the cable is able to withstand a tensile force of at least 1000N without an average increase in light waveguide attenuation of more than 0.40 dB.

5. An optical service cable as recited in claim 1 wherein the outer jacket is extruded directly onto at least one of the anti-buckling members.

6. An optical service cable as recited in claim 5 wherein the cable is able to withstand a tensile force of at least 1000N without an average increase in light waveguide attenuation of more than 0.40dB.

7. An optical service cable as recited in claim 5 further comprising at least one tensile filament laid with the plurality of strength members.

8. An optical service cable as recited in claim 7 wherein the cable is able to withstand a tensile force of at least 1000N without an average increase of light waveguide attenuation of more than 0.40dB.

9. An optical service cable, comprising:
a core buffer tube;
a plurality of light waveguides loosely held in the core buffer tube, the length of each light waveguide being greater than the length of the buffer tube, and each light waveguide having an outer coating;
a flame retardant outer jacket; and, a water absorptive member and a plurality of anti-buckling members between the core buffer tube and the outer jacket, the cable being all dielectric and having a secant flexural modulus of elasticity of greater than 50 MPa and less than 100 MPa.

10. An optical service cable, comprising:
a core buffer tube;
a plurality of light waveguides loosely held in the core buffer tube, the length of each light waveguide being greater than the length of the buffer tube, and each light waveguide having an outer coating of a material having a secant flexural modulus of elasticity at a 5% strain of less than 200 MPa;
at least one water absorptive member laid over the core buffer tube and a plurality of anti-buckling members laid over the water absorptive member; and,
a flame retardant outer jacket containing the buffer tube, water absorptive member and anti-buckling members, the cable being all dielectric and having a flexural modulus of elasticity of less than 300 MPa and being able to withstand tensile forces of at least 668N without an average increase in light waveguide attenuation of more than 0.40 dB.

11. An optical service cable as recited in claim 10 wherein the light waveguide outer coating comprises a plasticizer-free thermoplastic material.

12. An optical service cable as recited in claim 10 wherein the light waveguide outer coating comprises an ultraviolet light cured acrylate material.

13. An optical service cable as recited in claim 10 wherein the outer jacket is extruded directly over at least one of the anti-buckling members.

14. An optical service cable as recited in claim 13 wherein the antibuckling members comprise resin impregnated fiberglass yarns.

15. An optical service cable as recited in claim 14 wherein the cable is able to withstand a tensile force of at least 1000N without an average increase in light waveguide attenuation of more than 0.40 dB.

16. An optical service cable as recited in claim 10 further comprising at least one tensile filament laid with the plurality of anti-buckling members.

17. An optical service cable as recited in claim 16 wherein the cable is able to withstand a tensile force of at least 1000N without an average increase in light waveguide attenuation of more than 0.40dB.

18. An optical service cable as recited in claim 16 wherein the tensile filament is an aramid fiber and the anti-buckling members are resin impregnated fiberglass yarns.

19. An optical service cable as recited in claim 10 wherein the plurality of anti-buckling members is laid over the water absorptive member such that the strength members cross over the water absorptive member at intervals of a length between 10 and 500 mm; and the cable has a flexural modulus of elasticity of less than 100 MPa.

20. An optical service cable, comprising:
a core buffer tube;
a plurality of light waveguides loosely held in the core buffer tube, the length of each light waveguide being greater than the length of the buffer tube, and each light waveguide having an outer coating;
a water absorptive member laid over the buffer tube and a plurality of strength members laid over the water absorptive member such that the strength members cross over the water absorptive member at intervals of a length between 50 and 220 mm; and,
a flame retardant outer jacket containing the buffer tube, water absorptive member, and strength members, the cable being all dielectric and having a flexural modulus of elasticity of less than 300 MPa.

* * * * *